(12) United States Patent
Bent et al.

(10) Patent No.: US 6,901,441 B2
(45) Date of Patent: May 31, 2005

(54) KNOWLEDGE SHARING BETWEEN HETEROGENEOUS DEVICES

(75) Inventors: Graham Bent, Southampton (GB); Duncan George Clark, Yateley (GB); Christopher Edward Sharp, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 09/834,782

(22) Filed: Apr. 13, 2001

(65) Prior Publication Data

US 2002/0026471 A1 Feb. 28, 2002

(30) Foreign Application Priority Data

Jul. 12, 2000 (GB) .............................................. 0017023

(51) Int. Cl.[7] ........................................... G06F 15/173
(52) U.S. Cl. ...................... 709/223; 709/203; 709/221; 718/100; 718/101
(58) Field of Search ................................. 718/100, 101, 718/102, 103, 104; 709/220, 223, 316

(56) References Cited

U.S. PATENT DOCUMENTS

| 4,586,158 A | 4/1986 | Brandle ....................... 364/900 |
| 6,536,037 B1 * | 3/2003 | Guheen et al. ............. 717/151 |
| 6,742,015 B1 * | 5/2004 | Bowman-Amuah ......... 718/101 |

OTHER PUBLICATIONS

"About Application Sharing", from web site http://www.sametime.com/doc/sthelp 1626a8525679000574dl4?OpenDocument.

* cited by examiner

Primary Examiner—Majid A. Banankhah
(74) Attorney, Agent, or Firm—Duke W. Yee; A. Bruce Clay; Francis Lammes

(57) ABSTRACT

The invention relates to an application adapted to run on a client apparatus connectable with a server across a network. The server is adapted to simultaneously share information (ideas) maintained therein with a plurality of heterogeneous clients. The application is able to retrieve ideas from the server and to define new ideas in a manner dependent on the client apparatus platform. The newly defined ideas can then be transmitted to the server for maintenance in a platform-independent manner. At the client, the information is rendered appropriately for that client.

17 Claims, 13 Drawing Sheets

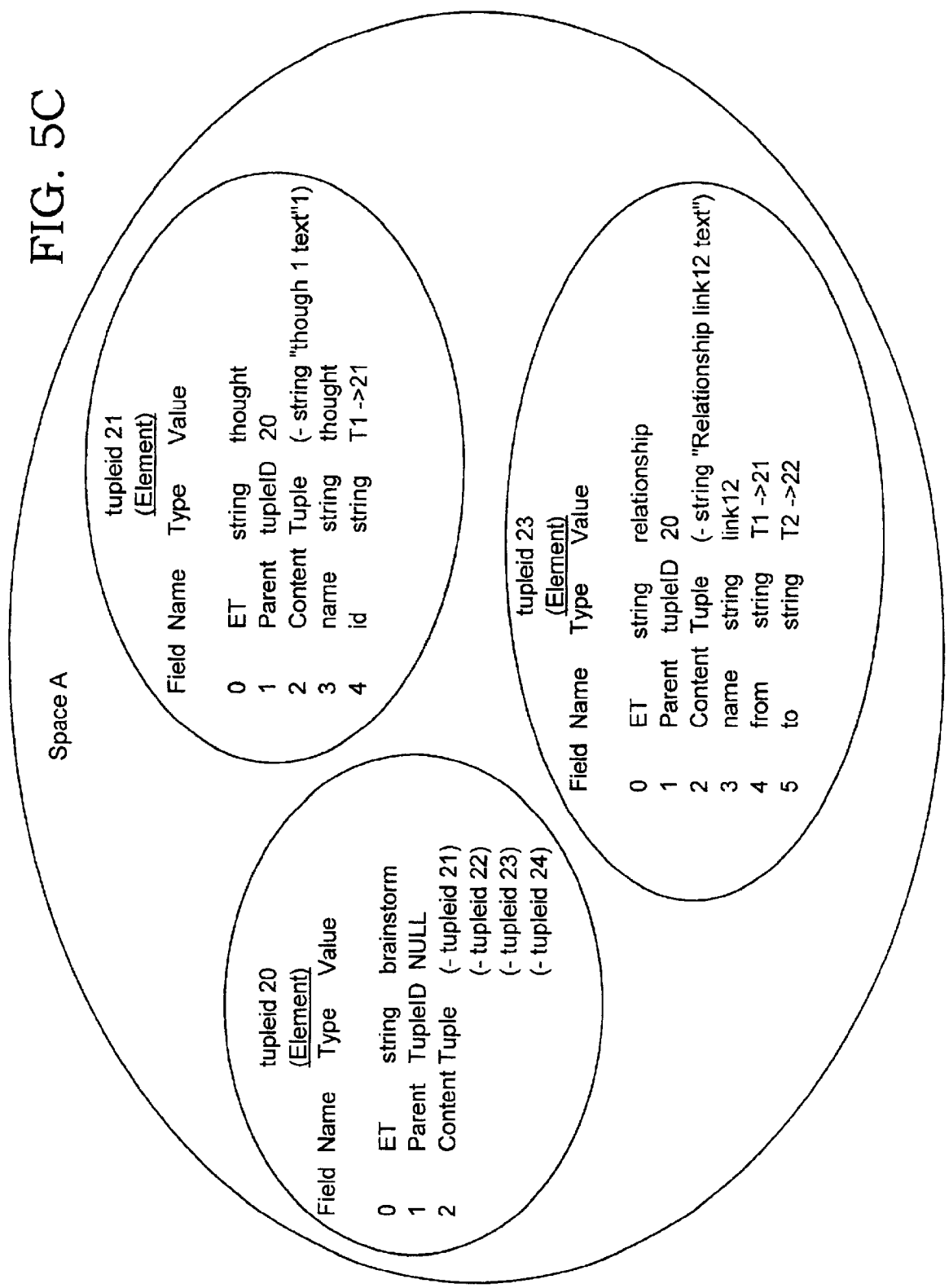

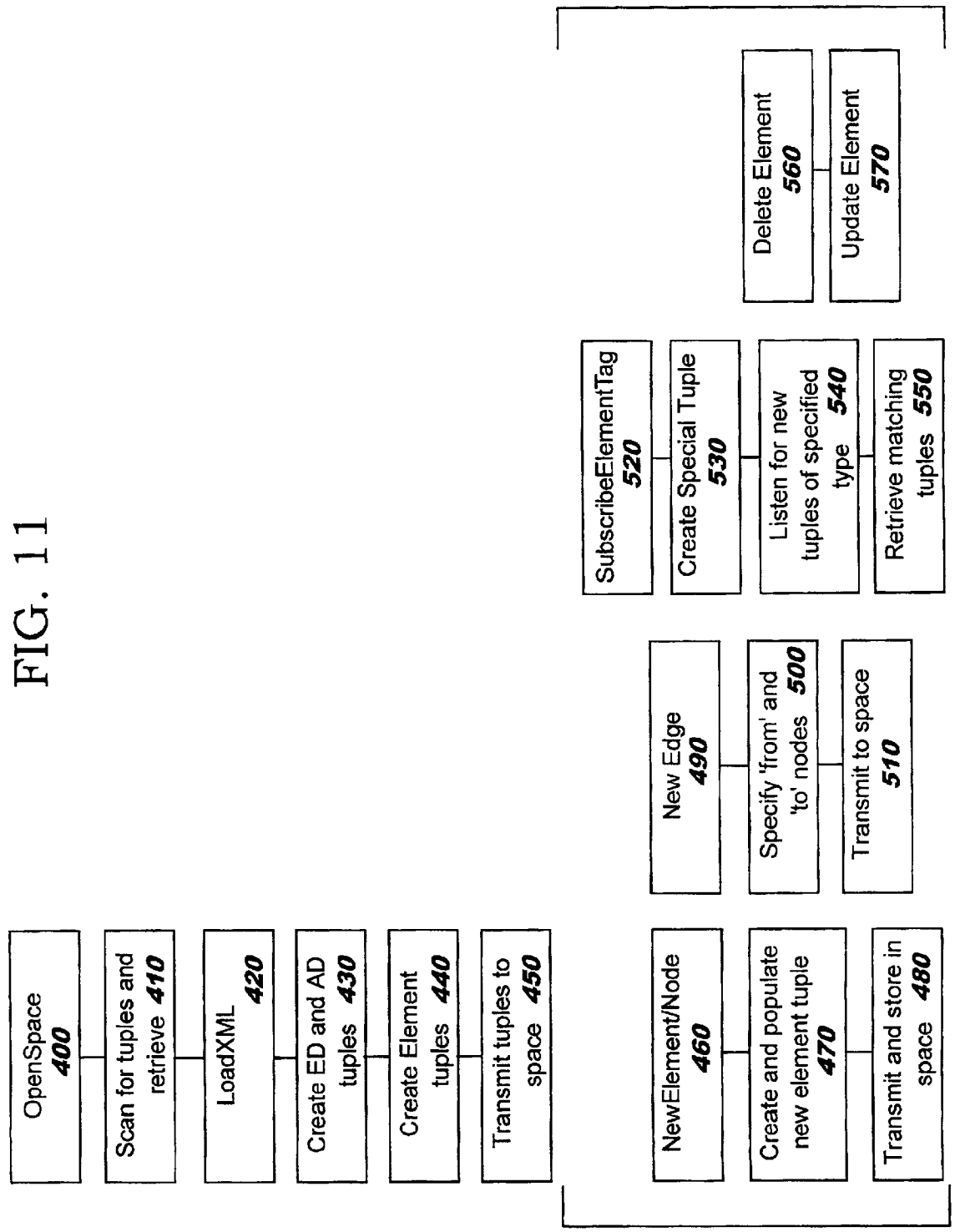

KNOWLEDGE SHARING BETWEEN HETEROGENEOUS DEVICES

The present invention relates to the field of knowledge sharing, and more particularly to knowledge sharing between heterogeneous devices.

In an ideal situation, all members of a project are based at the same location and can therefore easily convene to communicate and share their ideas with one another. This however is invariably not possible. An international company, for example, will typically have team members based at a variety of different locations across the world and thus meeting in person is often not practical, let alone feasible.

A variety of media can therefore be employed to facilitate team discussions. Telephone conferences are well known in the art, however these do not provide a visual means of communication. Video conferences enable team members to "see" real-time images of one another and even to present documents as scanned images. However, such documents can not normally be easily edited by team members.

At the same time, different people have preferences in terms of their means of expression (for example some like to draw pictures to illustrate ideas, whilst others prefer to explain in words). Thus ideas can be expressed in a variety of different media, allowing people a richness of expression.

However computer technology is often not used because of the difficulty in capturing ideas electronically and then expressing them in a suitable medium for transmission and relaying to other meeting participants.

The Lotus Sametime product, Meeting Center, does however attempt to enable users to exchange ideas electronically by providing for a shared whiteboard on which they can express themselves using text and pictures. Files can also be attached to the whiteboard for viewing by other team members and applications can be shared. Note, there are a number of other products on the market which provide a similar service (e.g. NetMeeting from Microsoft).

Such products are not however intended to operate across different types of platform. Information is rendered near identically on all machines which must therefore provide similar functionality in terms of display capability and support for graphics, audio, voice recognition etc. Team members might however wish to communicate with one another using different types of devices. Such devices will typically have widely varying characteristics. For example, a traditional desktop personal computer is fairly flexible with a relatively large display area. However a palmtop or indeed a mobile telephone handset is far more limited and can hence display fewer items simultaneously. Some devices may cope well with graphics, voice recognition etc., whilst others are more primitive. Hence sharing the same ideas between a plurality of heterogeneous clients can prove problematic, if impossible.

Extensible Markup Language (XML) is increasingly being used to represent structured data to be exchanged between different systems or parts of a system. Applications can therefore make use of an XML hierarchical representation of, for example, the user interface ("XML UI representation") written according to a suitable set of XML definitions. An example of such a set of definitions is disclosed in co-pending U.S. application Ser. No. 09/321, 700. (Note, "Structuring Complex Content for the Web, XML, Extensible Markup Language", by Elliotte Rusty Harold, ISBN 0-7645-3199-9, provides an overview of this markup language.)

A notable feature of the co-pending application, is that the XML UI representation is not intended to reflect the presentation that might take place on any particular input/output device, rather that applications are intended to operate with platform specific renderers which are responsive to a common user interface definition to present the user interface suitably on respective devices with widely differing characteristics.

Whilst therefore it is known to use XML to provide device independent rendering of documents and whilst it is also known to use http protocols to provide access to a distributed database, these technologies do not allow clients to dynamically edit the documents or to be informed when a document they are viewing has changed. In other words, read access only is provided.

Accordingly the present invention provides an application according to claim 1.

In a further aspect, the present invention provides a method according to claim 17.

In a yet still further aspect, the present invention provides a computer program product comprising computer program code stored on a computer readable storage medium, the program code comprising an application as claimed in claim 1.

Preferably, the application is interactive. Thus the retrieved ideas are rendered according to the client platform and a user can then manipulate these ideas. In other words, the information does not necessarily manifest itself identically on each and every one of the client platforms participating in a knowledge sharing session. For example, some platforms may use graphics whilst others voice technology, some may use both. This is particularly advantageous since the prior art typically requires users to work together using the same platform, or at the very least using devices with similar capabilities, processing power etc.

Alternatively, the application is non-interactive. It monitors the ideas as they are transmitted to the server and responsive to new ideas of a pre-determined type being transmitted, searches for additional information relating to those ideas. Examples of such an applications include internet search engines, multi-media jukeboxes etc. Such applications can retrieve video, music, facts etc. relevant to the ideas being transmitted to the server. These pieces of additional information can then be encoded as ideas for transmittal to the server.

Thus the invention is particularly useful to market research and advertising campaigns, brainstorming sessions, team meetings etc. It allows a group of people to simultaneously share information, and to receive additional material based on the information added by members of the group or back-up data sources. A user is able to manipulate ideas even if they are not the owner of those ideas (i.e. the original creator). Clients are informed of any changes to the ideas maintained at the server and are therefore able to receive the latest, most up-to-date state of these ideas.

Preferably new ideas are maintained at the server as tuples of a TupleSpace (the TupleSpace Product is available from IBM Corporation). According to the preferred embodiment, each Tuple is an ordered collection of fields. Each field consists of: an optional name (e.g. Name); a type (e.g. string); and a value (e.g. Bill). A TupleSpace represents a named bag of tuples. Tuples can be inserted into the bag, updated (with new content or structure) and deleted, thereby storing information in a very flexible format.

According to the preferred embodiment, the ideas comprise at least one relationship idea having attributes defining a link between two other ideas. At least one of the ideas includes a name attribute.

Preferably the ideas are of one or more types and upon definition of a new type, the application adapts its graphical user interface (GUI) to present the new type for inclusion in a particular knowledge sharing session. Thus the user-interface is extremely flexible. A user may decide that a current set of idea types are not sufficient to express certain information. They can therefore submit a new type for use by those participating in the session.

According to the preferred embodiment, idea types are thoughts, images and groups of ideas. A client application may subscribe to specified idea types such that the client application is informed when ideas of that type are transmitted to said server. (Initially all ideas of the specified type(s) present at the server are retrieved.) For example, some people think best using pictures. Thus the user of a client application may wish to receive image ideas only. The user is not therefore bombarded with additional information of no interest to them, but may focus of the type of material with which they are able to be the most productive and creative.

Preferably ideas of at least some idea types are defined as being adapted to contain ideas of at least one idea type. Thus it is possible to construct hierarchies of ideas. Ideas may be moved in a hierarchy according to idea types and may also be transferred between hierarchies according to idea types. Ideas can thus be organised to allow users to work on different parts (levels or tasks) of the overall information structure. This is particularly useful in a project type environment where team members (or groups of) are allocated their own specific areas of responsibility and do not want to be distracted by the additional work going on around them. Read/write permissions could also be associated with different levels/tasks.

According to the preferred embodiment, it is also possible to select one of ideas rendered at the client and to convert that idea, and any ideas below the idea in a hierarchy, to a markup document. The markup document preferably comprises definitions associated with any idea types of ideas within the hierarchy and definitions of any ideas within the hierarchy. This enables a knowledge sharing session (or part of) to be saved out to file. The document can then be formatted and further manipulated as desired for display using style sheets or other Extensible Style Language (XSL) translators (e.g. for display as a web page etc.). It can also be loaded at the client and transmitted to the server for sharing with other heterogeneous clients at a later date. Thus the application is also able to load in a markup document comprising definitions associated with any idea types of ideas within a hierarchy of ideas in the document and definitions of any ideas within the hierarchy as new ideas. Preferably the markup document language is Extensible Markup Language (XML).

A preferred embodiment of the present invention will now be described in detail, by way of example only, and with reference to the following drawings:

FIG. 5c illustrates the structure of an example set of Element tuples;

FIG. 11 is a flow chart of a worked example of the present invention.

Figure 1:
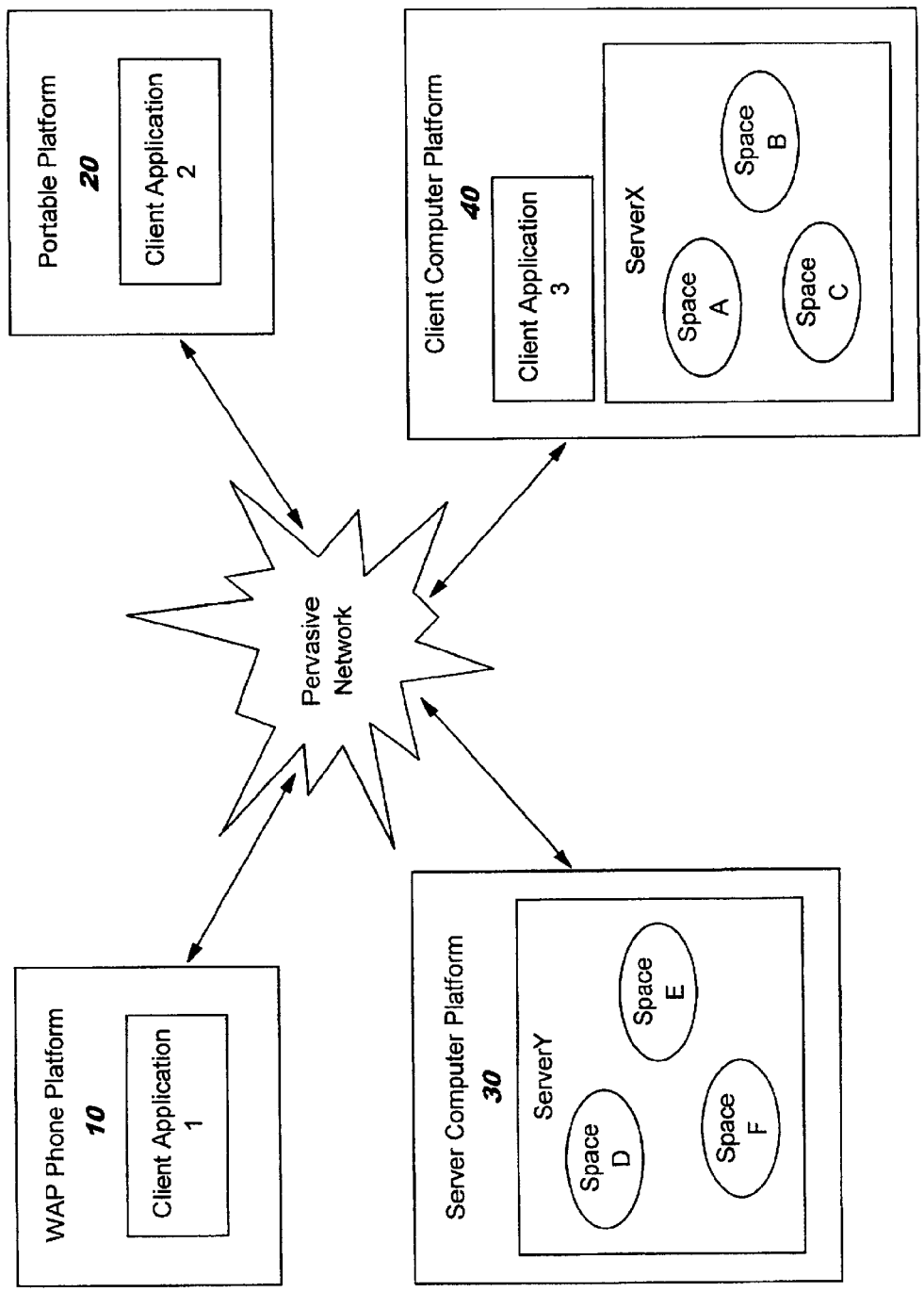
FIG. 1 shows the operating environment of the present invention according to a preferred embodiment.

FIG. 1 shows the operating environment of a preferred embodiment of the present invention. A plurality of heterogeneous computer platforms 10, 20, 30, 40 communicate with one another over a pervasive network 50 (e.g. the Internet) using existing protocols such as TCP/IP. The platforms shown (WAP phone, portable (e.g. Palm Pilot), server, client) are examples only. Thus the invention is applicable to any device with computing functionality.

Each computer platform can support any number of client and/or server applications. Each client application 1, 2, 3 enables a person to exchange ideas and knowledge dynamically with other clients. According to the preferred embodiment browser applications are used, however the invention is not limited to such. Other client applications, for example search engines, data mining tools and knowledge management tools may also be used.

Figure 2:
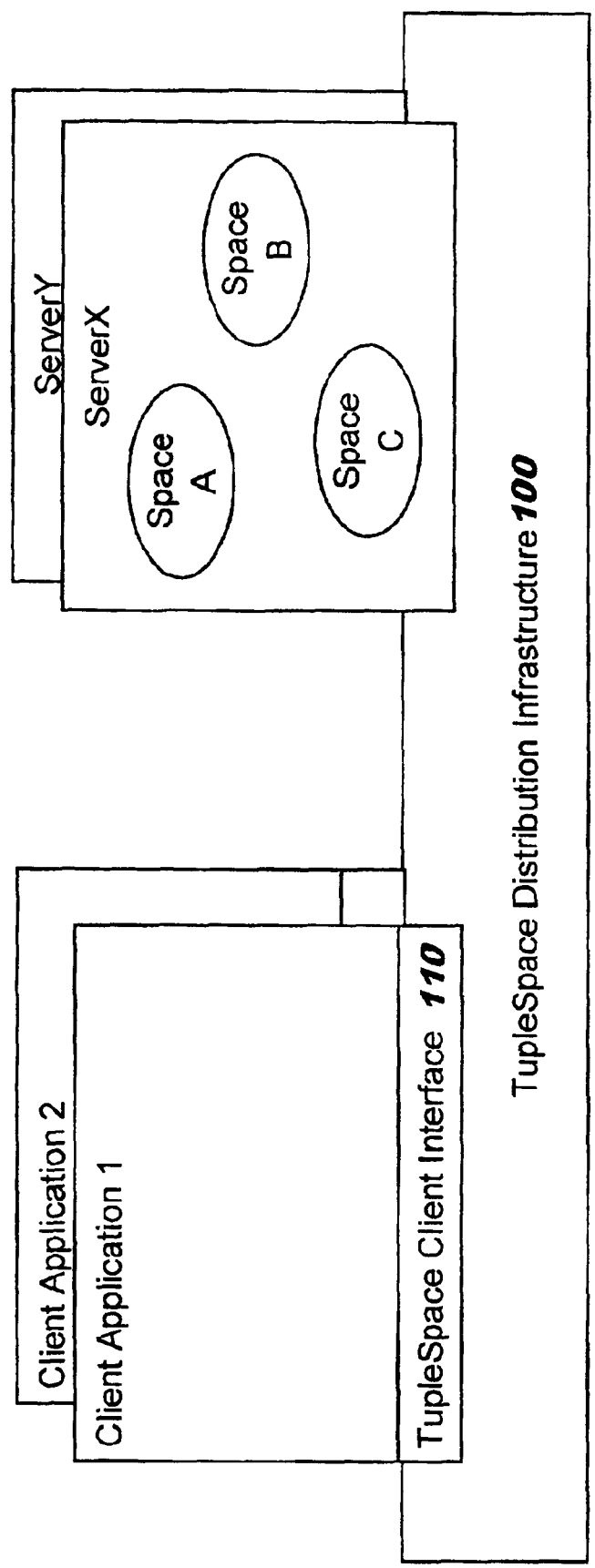
FIG. 2 illustrates a TupleSpace implementation of a preferred embodiment of the present invention.

In the preferred embodiment, ideas and knowledge are stored in TupleSpaces (the TupleSpace product is available from IBM Corporation), FIG. 2. A TupleSpace is a shared named collection (bag) of Tuples. The basic operations supported by the collection are to add a Tuple to the space (write), and to remove one from the space (take). The collection is stored and administered across a network on one or more "T Space Servers". Several threads or processes on the same or different machines can be accessing the space simultaneously. Some will be adding tuples to the space and some removing them. A client thread accesses the collection/space using the methods of an instance of a java class. For each different TupleSpace a client wishes to access, it requires a separate instance of this class, even if they are managed by the same server. The details of how the operations are completed are hidden from the user. All they need is the name of the space, and the name of a server that manages that space. More information can be found in "IBM T Spaces Programmer's Guide" at http://www.alphaworks.ibm.com/examples/tspaces/html/progrguide.ht ml In the present example, spaces A–C are held on server application ServerX and spaces D–F (not shown) on ServerY. Each space includes at least one tuple (not shown) with each new idea being inserted into a space as a tuple. Each client application 1, 2 (3 not shown) communicates via a TupleSpace client interface 110 over a TupleSpace Distribution Infrastructure 100 with a specified Space(s) A–F which is contained within a TupleSpace Server application(s) ServerX, ServerY. These applications ServerX, ServerY are used as a means of providing distributed database access to the ideas being exchanged. Clients directly invoke a set of services (via their browser application or other client applications) to manipulate the information in the database, as well as to add new information and delete old information. Any person or application connected to a specified space(s) is able to receive the latest state of each idea (i.e. tuple) within that space(s) as it changes, as well as to make changes to an idea(s) themselves (whether or not they are the 'owner' (i.e. creator) of that idea(s)). The client applications identify the appropriate space by specifying the computer platform 30, 40 on which the server application, ServerX, ServerY, containing the Space is running (as an Internet Protocol (IP) Address), the TupleSpace server (identified by the Internet Port number the server application is attached to) and the name of the Space within that server (any one of A–F).

It will be appreciated that although the preferred embodiment uses a TupleSpace other distributed forms of information storage that provide similar functionality could be used instead.

Figure 3:
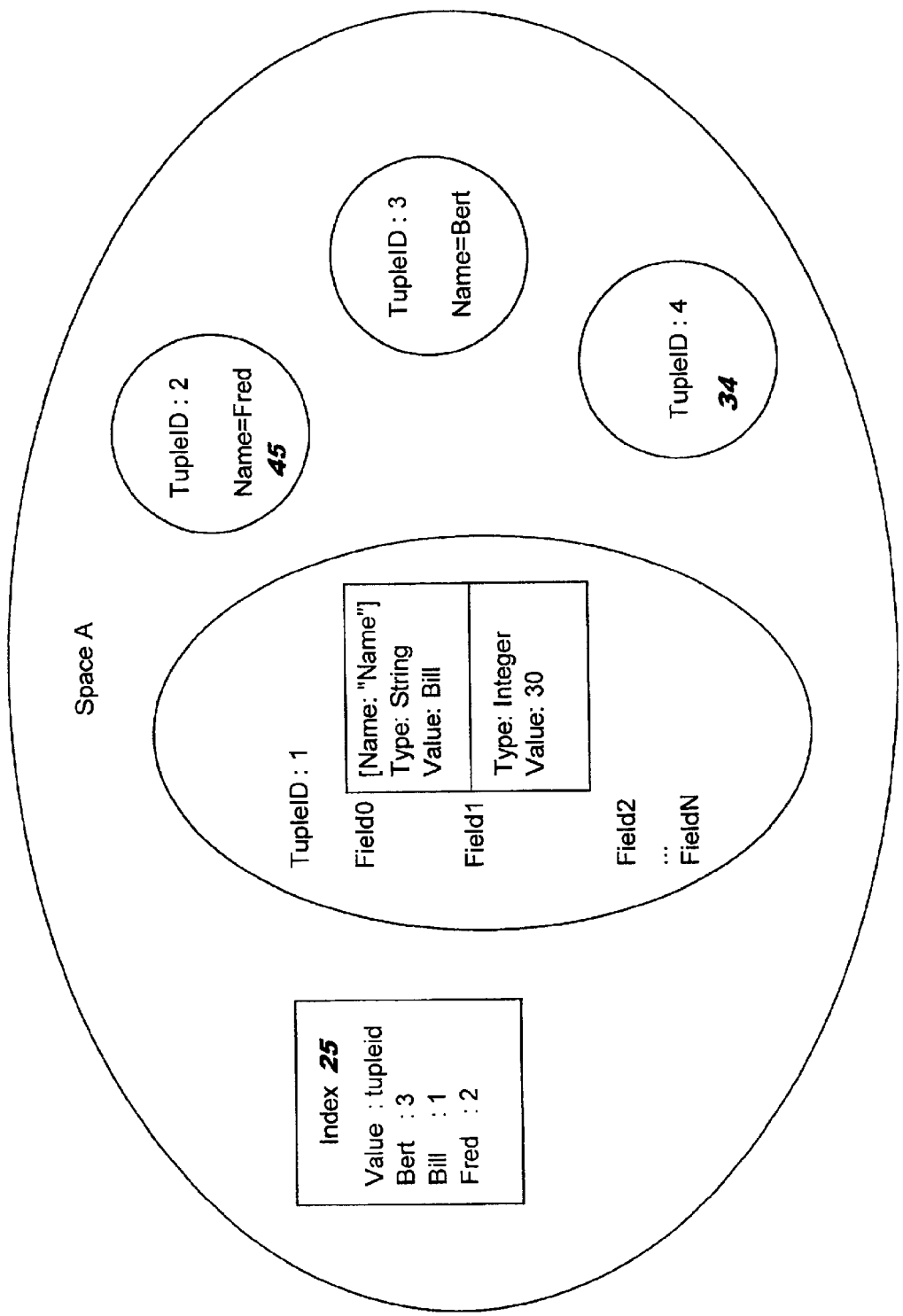
FIG. 3 illustrates the principles of storing information in a TupleSpace in accordance with a preferred embodiment of the present invention.

FIG. 3 illustrates the principles of storing information in a TupleSpace according to a preferred embodiment of the present invention. As a new idea is added to a space A, a tuple is created in which to contain it. Each Tuple has a unique identifier (TupleID) 1–4 and is an ordered collection of fields. TupleID 1 for example includes field0–fieldN. Each field consists of: an optional name; a type; and a value. To use field 0 of TupleID 1 as an example, these are "Name", String and Bill respectively.

There are no constraints as to the field structure of any Tuple. Thus TupleID 2 has a similar structure to TupleID 1, TupleID 3 has the same named Field 0 but no equivalent Field 1, and TupleID 4 has a completely different structure.

A Space therefore represents a named bag of tuples. Tuples can be inserted into the bag, updated (with new content or structure) and deleted thereby storing information in a very flexible format.

Searches can be undertaken to retrieve Tuples that have specified types. For example, searching for all Tuples that have a structure of (String, Integer) would retrieve TupleIDs 1 and 2. It is also possible to retrieve tuples that have specific field values or ranges. For example, searching for a tuple with a field0 of type String and field1 between 25 and 40 would retrieve TupleID 1.

Thus any named fields can be used to provide a searchable index 25 which holds a lookup of the value of that field against the TupleID for the containing Tuple. This could for example be on field0 (i.e. the "Name" field), in which case: TupleID 3 has a value of "Bert"; TupleID 1 has a value of Bill; and TupleID 2 has a value of Fred. Searching, for example, for Tuples with the field "Name" starting with "B" would retrieved TupleIDs 3 and 1 (i.e. Bert and Bill).

Furthermore, a client application preferably registers with the Space A to be informed whenever Tuples that match the search criteria get changed (added, deleted or updated). This allows the client application to subscribe to certain ideas and information and be told whenever those ideas are changed. Thus, the client application does not have to poll for changes and is informed when relevant information has changed.

Figure 4:
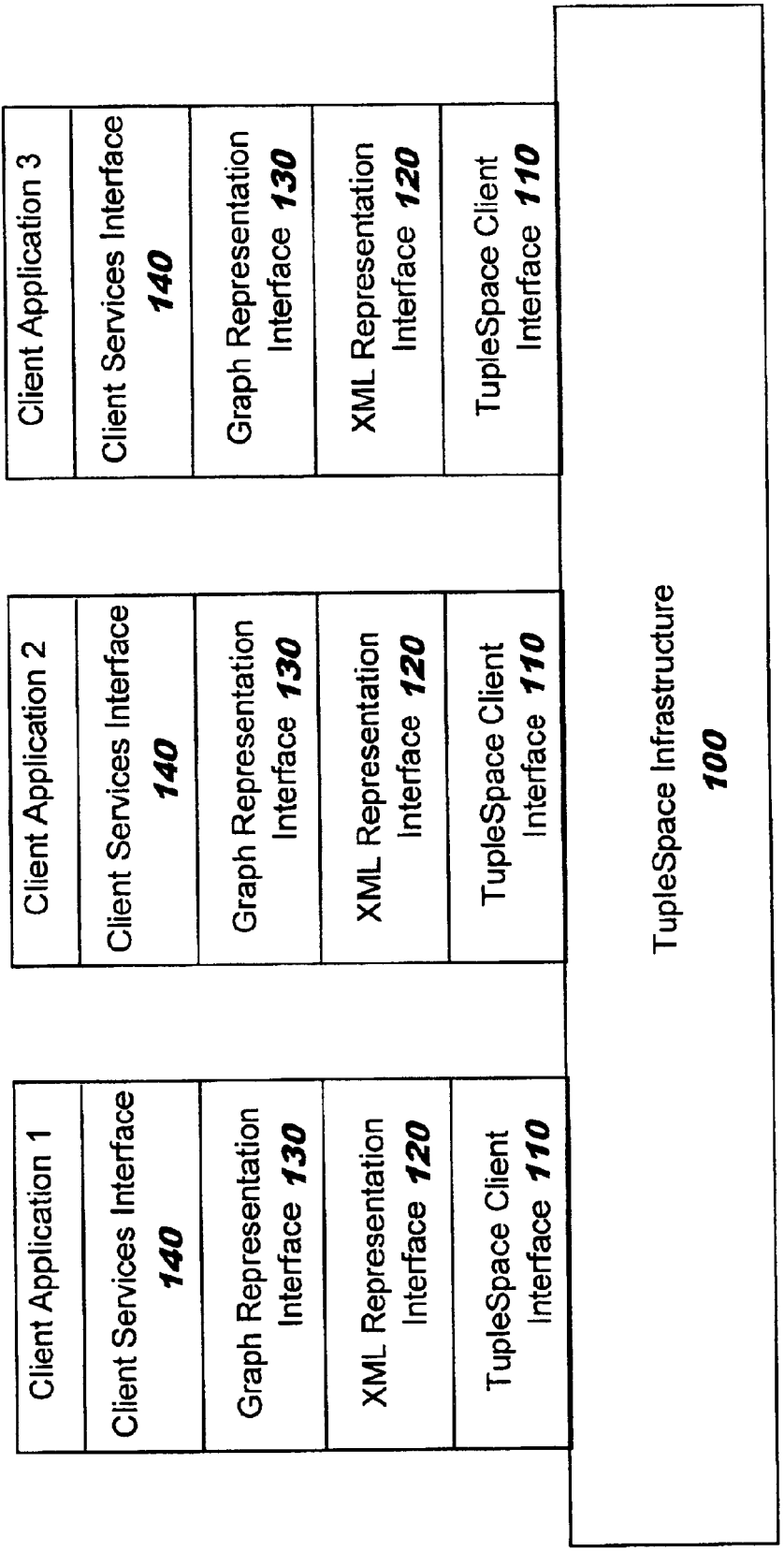
FIG. 4 shows the layered architecture of the present invention according to a preferred embodiment.

According to the preferred embodiment, the invention is realised by providing a layered interface between the Client Applications 1, 2, 3 and the TupleSpace Distribution Infrastructure 100. FIG. 4 illustrates this layered interface.

The TupleSpace Client Interfaces 110 and the TupleSpace Distribution Infrastructure 100 have already been described and provide the distribution and means for communicating dynamically updated ideas between the clients. Layer 110 will however be explored in more detail below. Further the XML Representation interface 120, the Graph Representation interface 130, the Client Services Interface 140, and the Client Application 1, 2, 3 will be discussed for the first time.

XML Representation Interface

As previously mentioned, information is, according to the preferred embodiment, stored as tuples in a TupleSpace for manipulation by heterogeneous clients.

ElementDeclaration tuples describe the different types of element that can be used to share information and their possible attributes and content. In the preferred embodiment, thoughts, images, groups, relationships and hierarchies are used. AttributeDeclaration tuples describe the attributes associated with the ElementDeclaration tuples. Element tuples are used to describe instances of the ElementDeclaration tuples (i.e. specific thoughts, images etc.). Thus the ElementDeclaration and AttributeDeclaration tuples define the semantics in which ideas can be expressed and the Element tuples provide a means of realising specific ideas.

The tuples provide a platform independent way of storing information. They correspond to the components of an Extensible Markup Language (XML) document and thus information may be saved out to file at a client. Style sheets or other Extensible Style Language (XSL) translators can be used to format the information as desired (e.g. for display as a web page etc.). The captured information may also be loaded into a TupleSpace at a later date for further manipulation by those clients which are able to connect to that space.

An XML file typically has two portions: A Document Type Descriptor (DTD) which identifies the different types of element, and a main document that identifies the specific elements (or ideas) that are included in the document. Thus it can be seen that the ElementDeclaration tuples and the AttributeDeclaration tuples correspond to the components of a DTD, and the Element tuples correspond to the components of a main document. Appendix A shows an example DTD defining the types of Element (i.e. the Element Declaration tuples and the AttributeDeclaration tuples) used in a previously created brainstorming session. Appendix B shows an example main document of a specific brainstorm of Elements (i.e. thoughts, images etc.) that has been created using the tuples of the DTD.

It will be appreciated that XML provides a fairly rigid structure for defining hierarchical information. Defining information which can be related to the typical XML form instead as tuples, frees the information from that rigid structure. Multiple hierarchies may be defined and assuming that the grammar (i.e. the DTD components) allow, Elements within a hierarchy may be transferred to another hierarchy, moved between levels etc.

An ElementDeclaration java class within the XML layer at the client is used to define the structure for populating the ElementDeclaration tuples at the client-end before they are transmitted to and stored in the space. The field structure as defined by the class is shown below:

| Field No | Label | Type | Content |
| --- | --- | --- | --- |
| 0 | ElementTagName | String | Element Tag Name |
| 1 | ContentModel | String | Content Model |
| 2 | ContentElements | Tuple | List of possible elements |
| 3 | Attributes | Tuple | Ordered list of attributes |

The content of each field will be explained in detail with reference to FIG. 5*a* which illustrates the structure of an example set of Element Declaration tuples. Note, these tuples are used to create any number of specific Elements based on the a respective Element Declaration tuples.

Figure 5A:
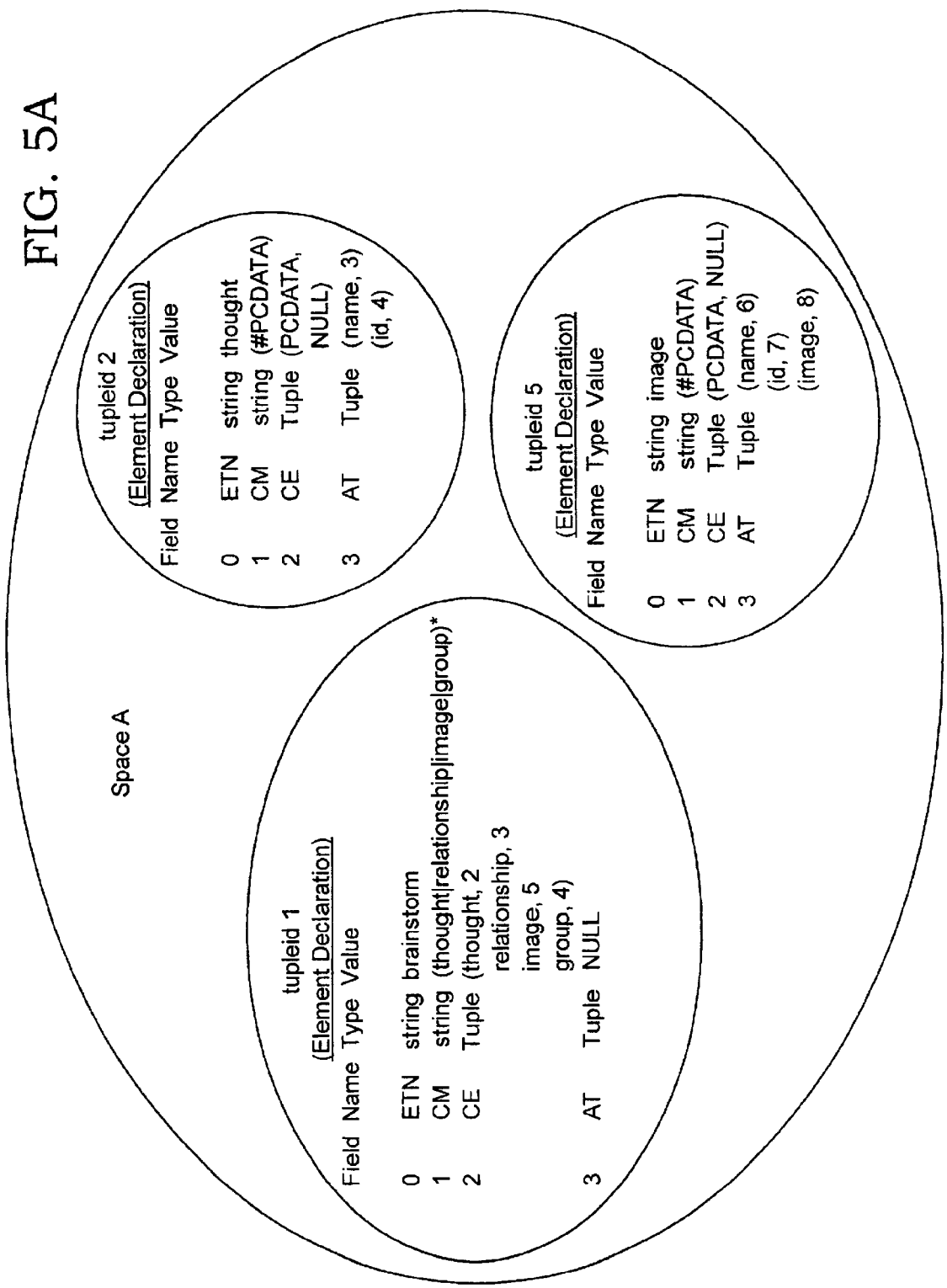
FIG. 5a illustrates the structure of an example set of Element Declaration tuples.
Figure 5B:
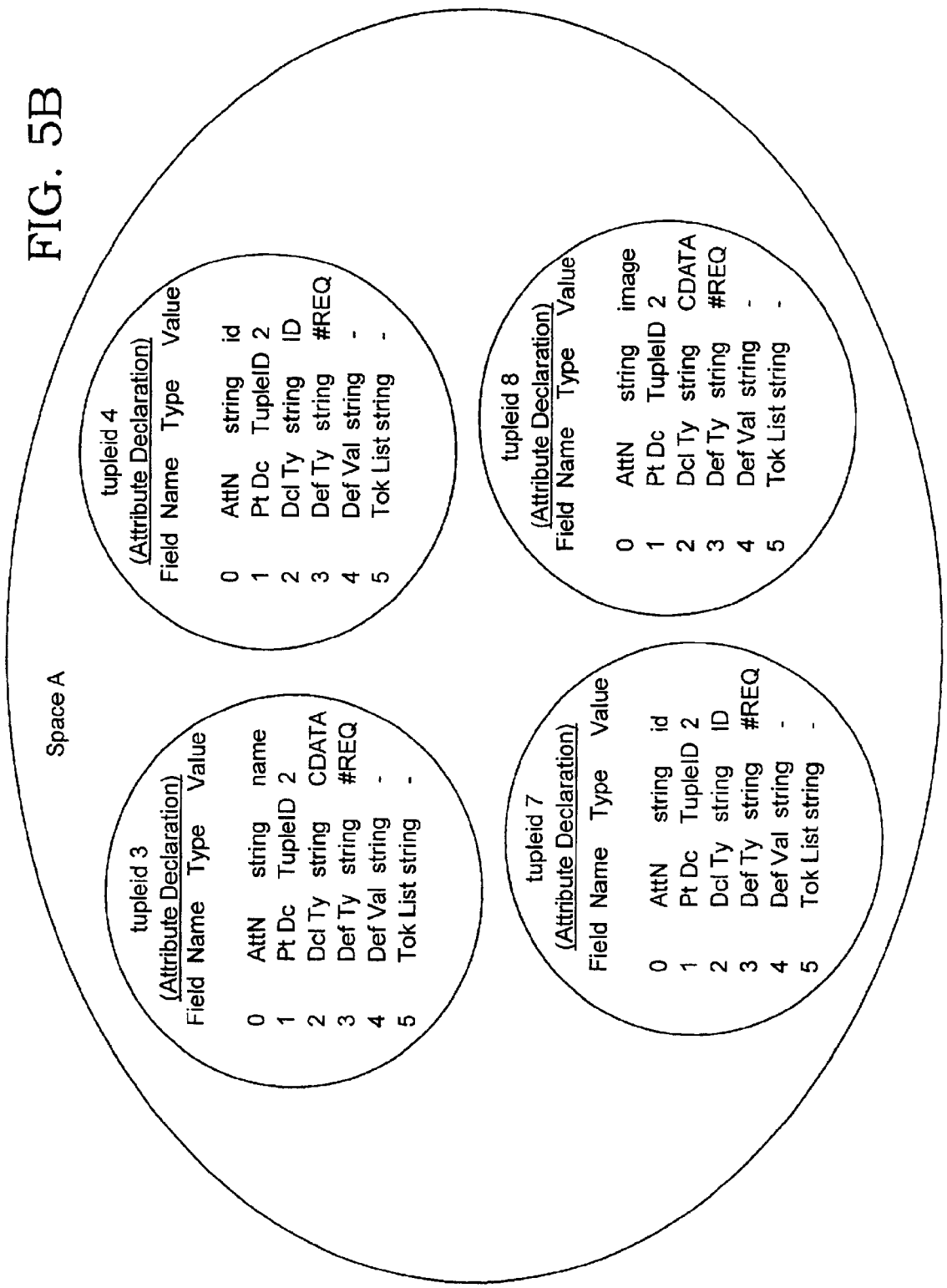
FIG. 5b illustrates the structure of an example set of Attribute Declaration tuples.

Note, by way of example it is assumed that the tuples stored within space A, and thus referenced in FIGS. 5a to 5c, were created in a previous session and saved out to XML. They have therefore been loaded in from an XML document (Appendices A and B). (However, this does not necessarily have to be the case).

As previously discussed with reference to FIG. 3, a tuple is an ordered collection of fields. Each field may contain an optional name, a type, and a value. It will be apparent that each tuple illustrated conforms to this structure.

According to the preferred embodiment and with reference to FIG. 5a, whenever a tuple is written to the space A, it is allocated a unique TupleID. The first element type in the preferred embodiment (also referenced by Appendix A using an <!ELEMENT> tag) is for a brainstorm. Thus space A contains an Element Declaration Tuple with a TupleID of 1, including a field 0 with a name of "ElementTagName" (ETN), a type of "string" and a value of "brainstorm". Note, the ETN is often used for searching to obtain the structure of any specific element.

A brainstorm may contain a plurality of thoughts, relationships, images and groups. This information is stored in field 1 as a content model (CM) of type string, with a value of (thought|relationship|image||group)*(see Appendix A). Thus the content model defines the other elements, text and data which can be embedded within this type of element and in what order.

Field 2 lists each of the content elements (CE) (i.e. thought, relationship, image and group) which may be embedded within the content of this element type (in accordance with the CM) and their corresponding tupleids. Thus it will be appreciated that each Element Declaration within the content model is stored as a separate tuple within the space.

Furthermore, each Element Declaration tuple may be associated with a number of corresponding Attribute Declaration Tuples which define the individual characteristics of an element type. The brainstorm tuple however has no attributes (AT) associated with it and hence field 3 has a value of NULL. Otherwise however, an ordered list of attribute declaration tupleids for the particular element type are contained within this field (see below). Naturally this field cannot be filled in until the Attribute Declaration Tuples have been created in the space and unique tupleids allocated to them.

As mentioned above, each type of element listed within the content model is stored within space A as a separate tuple. For the purposes of illustration, only the thought and image Element Declaration tuples are shown.

The thought Element Declaration tuple, stored as a tuple within the space, has been allocated a tupleid of 2. The fields follow the same structure as the brainstorm Element Declaration tuple, but naturally they contain different values.

Field 0 has an ETN of thought, with a CM of parsed character data (#PCDATA) and a CE of NULL (see Appendix A). This tuple does however contain two attributes (AT) of name and id. Name is stored as an Attribute Declaration Tuple with a tupleid of 3, and id also has its own tuple with a tupleid of 4. (In Appendix A, attributes are referenced by the <!ATTLIST> tag). The structure of Attribute Declaration Tuples as stored locally at the client-end is defined by a java class AttributeDeclaration. This structure is as follows:

| Field No. | Label | Type | Content |
|---|---|---|---|
| 0 | AttributeName | String | The name of the attribute |
| 1 | ParentDeclaration | TupleID | Id for parent elementdecl |
| 2 | DeclaredType | String | XML data type |
| 3 | DefaultType | String | XML default type |
| 4 | DefaultValue | String | Value if default supplied |
| 5 | TokenList | String | List of permissible enumeration values |

The meaning of each field will be explained in detail with reference to FIG. 5b.

An image is also defined by an Element Declaration tuple with a tupleid of 5 and this has AttributeDeclaration tuples (populated using the structure defined by the Attribute Declaration class) for name, id and image attributes.

It will be appreciated that Element Declaration tuples for relationships, groups and hierarchies (not shown), along with their corresponding AttributeDeclaration tuples will also be stored within space A since these too are defined in Appendix A.

With reference to FIG. 5b an example set of Attribute Declaration Tuples defined in Appendix A are shown. Element Declaration Tuple, tupleid 2 (for an element of type "thought") includes two attributes, name and id. FIG. 5b shows, amongst other things, the corresponding Attribute Declaration Tuple, tupleid 3, for the name attribute labelled according to the value within field 0. Since the name attribute is associated with Element Declaration tuple, tupleid 2, field 1 includes a parent declaration (Pt Dc) with a value of 2. It can be seen that field 2 contains a declared type (Dcl Ty) of CDATA and field 3, a default type (Def Ty) of #REQUIRED (#REQ). Note, the #REQUIRED symbol makes this field mandatory. The other choices in the XML standard are #IMPLIED, such that a person may enter a value in the associated field but is not required to do so, and #FIXED whereby the field includes a Default Value (Def Val). In this instance there is no Default Value and neither is there a TokenList (Tok List). A token list field is used to present a list of pre-defined enumeration values.

FIG. 5b also shows the Attribute Declaration Tuples for the id attribute (stored in tuple, tupleid 4) referenced by the thought Element Declaration Tuple, tupleid 2. Moreover, the Attribute Declaration Tuples for the image and id attributes referenced by Element Declaration tuple, tupleid 5, are also shown. The fields within these conform to the same structure as the name Attribute Declaration tuple, tupleid 3, but naturally they contain different values.

Having defined the available types of element for use in a brainstorming session via the Element Declaration and Attribute Declaration Tuples and classes, it is then possible to use these to create specific instances of each of the element types as appropriate. For example, to create a specific thought, image, group, or any number thereof.

Thus as previously discussed, the main document (Appendix B) identifies the specific elements (or ideas) that have been created within a particular brainstorming session and these are stored as Element tuples within the space, A. It should be noted that an Element java class is used to define the structure of the Element tuples as stored locally at the client-end. This structure is as follows:

| Field No. | Label | Type | Content |
|---|---|---|---|
| 0 | ElementTag | String | ElementDeclaration Tag Name |
| 1 | Parent | TupleID | Containing Element ID (if any) |
| 2 | Content | Tuple | ordered list of content |
| 3.. | AttributeName | String | Attribute Value |
| ..N | AttributeName | String | Attribute Value |

The meaning of the individual fields will be explained with reference to FIG. 5c which illustrates an example set of Element tuples defined in Appendix B.

Note, in the preferred embodiment java classes (e.g. ElementDeclaration, AttributeDeclaration and Element java classes) are used to render and manipulate the tuples. However, the invention is not limited to such. Information is structured appropriately for the computing device on which it is to be displayed.

With reference to FIG. 5c, as before each tuple is allocated a unique tupleid upon creation within the space and includes an ordered collection of fields, each with an optional name, a type and a value.

The first specific element referenced by Appendix B is for a particular brainstorming session. An Element Tuple, tupleid 20, thus has a field 0 with an ElementTag of type "string" and a value of "brainstorm". (Note, the ElementTag preferably uses an index based on the ElementDeclaration tag name (ETN), but could alternatively be resolved to the equivalent tupleid.)

The brainstorm element has no parent (since it is the containing element), but contains a number of elements (content) referenced within field 2. The content is represented as an embedded tuple (content tuple) (this could equally be implemented as a vector). Each element within the Content Tuple refers to a child element within the XML hierarchy. Text is implemented as a string field, images or other data as a serialised class, and references to other elements as tupleids. Element Tuple, tupleid 20 references Element tuples with tupleids of 21 to 24. Note, the content tuple does not in this case include the optional name in each field (hence the -).

Element Tuples, tupleids 21 and 23 only are illustrated in FIG. 5c by way of example. It can be seen that Element tuple, tupleid 20 doesn't have any attributes in line with its defining Element Declaration tuple, tupleid 1, (see FIG. 5a) where field 3 has a value of NULL. Other specific elements may have however have associated attributes. It will be appreciated that since these are named fields, elements can be searched for within the Space on the basis of their attributes (both by name and value).

It can be seen from Appendix B that three specific thoughts (thought1, thought2, t4), a relationship (link12), and a group (group) have been created within the overall brainstorming session. Element tuples, tupleids 21 to 25, define each of these. The brainstorm Element Tuple however only references tupleids 21 to 24 within its content model. Tuple, tupleid 25 (i.e. for t4) forms part of the group element tuple's content model and so the brainstorm tuple is not directly aware of it.

Element Tuple, tupleid 21, has an ET of thought and since it relates to the brainstorming session, has a parent tuple, tupleid 20. Its content is a string with the value "thought 1 text". As defined by its corresponding ElementDeclaration tuple (tupleid 2), a thought may have a name and an id attribute associated with it. Thus in this instance the name attribute in field three has a value of thought1 and the id attribute in field 4, a value of 21. Note, within XML (e.g. Appendix B) the id is initially given a value of T1, however when the information is written out to the space, this is replaced with a tupleid. Obviously this substitution cannot happen until the unique id for the particular Element tuple has been allocated.

Element tuple, tupleid 23, defines a relationship between two specific elements. In this case the elements defined by tupleid 21 and tupleid 22 (not shown). Its containing parent is the "brainstorm" Element tuple, tupleid 20, and its content is the string "Relationship link12 text" It is identified by the name "link12".

Thus it can be seen that the XML Representation Layer enables element types to be specified via Element Declaration and Attribute Declaration tuples. Further, specific Element instances can be created based on those Element Declaration and Attribute Declaration tuples using the structure defined by this layer (i.e. using the three java classes mentioned above).

It will be appreciated that other Element tuples may be created based upon the Element Declaration and Attribute Declaration tuples stored within the space as previously mentioned.

It should be noted that an Element is not restricted to one type of content (e.g. either textual content or image content). In an alternative embodiment, a person ElementDeclaration tuple is defined. A specific person element instance may, for example, contain the person's name, age and address (text), as well as their portrait (image). As before, the permissible content of a person element instance is defined by the person ElementDeclaration tuple's content model.

The definition of the structure of the information using XML is particularly advantageous since it allows the Client Applications to make use of the emerging techniques (as described in IBM co-pending U.S. application Ser. No. 09/321,700 ) to provide a rendering that is appropriate on the client application's host Platform. Thus different computing platforms may co-operate with one another to manipulate the same information. This information does not necessarily manifest itself identically on each and every one of these platforms. For example, some platforms may use graphics whilst others voice technology, some may use both. This is particularly advantageous since the prior art typically requires users to work together using the same platform, or at the very least using devices with similar capabilities, processing power etc.

Most of the work in this area has previously been applied to enabling renderings of the XML information. The invention on the other hand also translates the information from the host platform media format into the desired XML format for storage within a Space and thus allows editing or creation of new information in a media independent manner.

Graph Representation Interface

XML is however a document markup language and although it provides a flexible way of defining the structure of individual ideas, it is not ideally suited for expressing the relationships between disjoint ideas since XML is strictly hierarchical. This is especially true if those ideas have been defined using different semantics.

Figure 6:
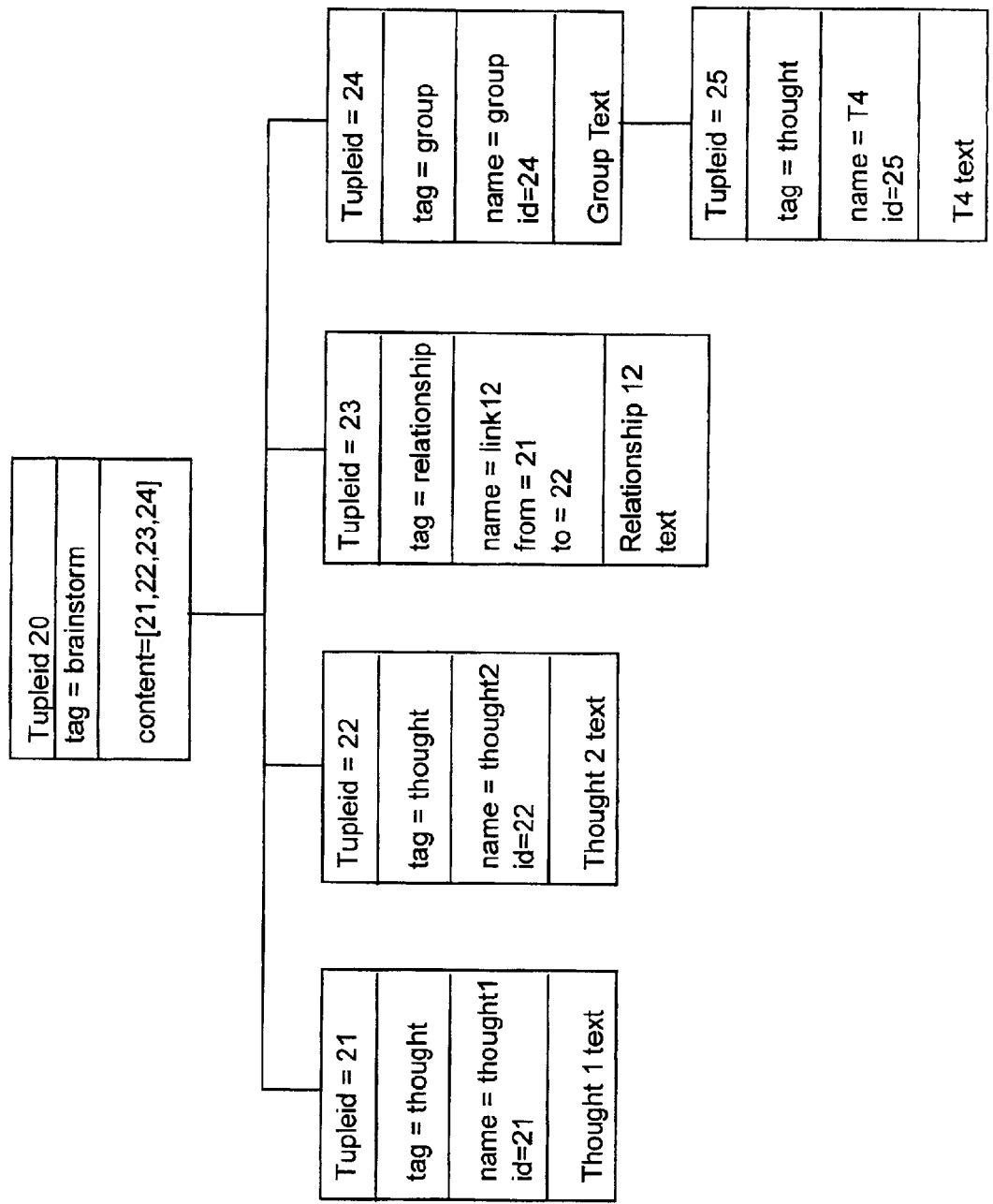
FIG. 6 shows the hierarchical way in which the XML Representation Interface views the tuples stored in the space according to a preferred embodiment.

FIG. 6 shows a view of the tuples stored within the space, as seen by the XML representation layer in accordance with a preferred embodiment. It is thus apparent that level 1 of the hierarchy defines the overall brainstorm structure. Level 2 includes a couple of thought elements, a relationship and a group. Since the thought element "t4" forms part of group (id G1), this is shown on level 3 of the hierarchy below the group tuple. The relationship element, link12 is shown on level 2 of the structure as an element in its own right, but the XML representation layer is not aware that the relationship element actually defines a link between thought1 and thought2.

The Graph Representation Interface 130 enables organisation of the relationships between ideas by expressing those ideas (in their XML form) as a directed graph. A directed graph, as is known in the art, may contain any number of nodes, as well as edges linking those nodes together. For each link a first node (a 'from' node) is linked via one of the edges to a second node (a 'to' node). A directed graph is used to show the direction in which each link occurs (i.e. which is the 'from' node and which is the 'to' node).

Any XML element can be considered a Node of the graph by including a "name" attribute in its DTD definition (see FIG. 5a, Element Declaration tuple, tupleids 2 and 5). Preferably, this "name" attribute should encapsulate the idea in text in the fewest possible words.

Any XML element can be considered an Edge by including three attributes "name", "from" and "to" and thus enabling two nodes to be linked together (i.e. forming a relationship between the two). The "name" attribute encapsulates the idea as for the node, while the "from" and "to" attributes specify the nodes between which the directed relationship applies. Although a relationship Element Declaration tuple has not been represented as part of FIG. 5a, it can be seen that Appendix A does define an element type of relationship and its corresponding attribute list (<!ATTLIST>) includes all three attributes.

When edges exist in a Space, the "from" and "to" attributes refer to the Tuple that represents the Node XML Element. As previously mentioned, in the preferred embodiment an XML file (e.g. Appendices A and B) defines the tuples present within a space. When this file is read into this space, the information is converted into corresponding tuples, each with their own unique tupleid. Relationships in XML however are identified as IDREF type attributes. According to the preferred embodiment, each type of element (with the exception of Edges) includes an id attribute by which to identify a particular instance of that element. It can be seen from Appendix B that thought1 has an id of "T1" and thought2 has an id of "T2". Thus for example, a relationship may be defined naming T1 as the source and T2 as the destination ("link12" relationship—see Appendix B). In an alternative embodiment, each edge also contains an id attribute and thus one edge can reference another. Relationships can therefore be formed between edges. Also in an alternative embodiment, a constraint is placed on the types of element which may be joined by an edge. For example, an edge of type "married" may only link two nodes of type "person" (assuming that such types of element have been defined).

According to the preferred embodiment, when the XML file is loaded into the Space, the IDREFs (e.g. T1 and T2) are converted into TupleIDs as and when these are allocated. If at some point, the tuples within the space were saved back out to XML, the tupleids would be converted into an XML compatible form (for example, an element's id attribute becomes the string value of its TupleID and any referring attributes such as 'from' and 'to' get saved as the string value of the referred to tuple's tupleID. Once again these are of an IDREF type. Thus it would be possible in the future to load the XML file back into the space again and regenerate the relationships (albeit with different IDs).

The graph representation layer acknowledges that applications want to create nodes, and edges and provides direct support for entering the appropriate attribute values into the XMLised Tuples via methods exposed by this layer but provided by the TupleSpace Client Interface layer and detailed below with respect to that layer.

Note, according to the preferred embodiment the Graph Representation does not build a directed graph. Rather it exposes a CreateNode java method which requires a "name" by which to identify the node. A CreateEdge is also exposed which takes name, from and to attributes passed in as parameters. The Application and Client Services Interface can then use this to build the graph.

According to the preferred embodiment, a third construct is also used to assist in organising ideas. This is a Group and allows ideas to be clustered together without actually affecting the ideas themselves initially. A group is like an edge but it contains a "group" attribute (in addition to the "name" attribute) instead of the "from" and "to" attributes. This "group" attribute contains an ordered list of unique Node tupleids whilst in the TupleSpace and a list of IDREFs if expressed in XML. Once again appendix A shows an exemplary definition of a "group" element. In this instance, a single group may contain a number of thoughts; relationships; images; and groups. Appendix B then goes on to define a specific group called "group", with a content of "Group Text" and a thought "t4".

A CreateGroup java method is provided to enable ideas to be clustered. This method accepts a name attribute, as well as a list of the tuples (i.e. tupleids) that are to be included in the group.

Appendix A further defines a "hierarchy" element as consisting of any number of thoughts, relationships, images, groups and hierarchies. Note, appendix B does not however provide an example of a specific hierarchy element.

Via this construct, data can be further organised to allow users to work on different parts (levels or tasks) of the overall information structure. This is particularly useful in a project type environment where team members (or groups of) are allocated their own specific areas of responsibility and do not want to be distracted by the additional work going on around them. Hence individual elements, or groups of elements can be viewed and manipulated in isolation (see Appendix A). At anytime however participants can display other parts of/the whole of the information structure. Read/write permissions could however be associated with different levels/tasks. Further more than one hierarchy may be created within the same space and elements may be transferred between the hierarchies as long as the DTD permits this.

These four graph constructs allow the relationships between ideas to be visualised and manipulated providing a powerful means of discussing and organising the ideas in for example a team meeting or brainstorm scenario. When the clients are computer applications the graph concepts permit operations to be performed on the ideas such as clustering ideas with a common theme (grouping and classifying) or identifying relationships between ideas from the body of the idea descriptions.

Client Services Interface

According to the preferred embodiment, the client services interface 140 extends the TupleSpace client interface 110 to provide a range of services that relate to the XML and Graph Representation Interfaces. Client Applications 1, 2, 3 can use the TupleSpace client interface 110 directly if they so wish, however some new services are provided that have additional value.

An OpenSPace service makes a connection to the specified computer platform, server application and space. It then retrieves all the Element Declaration tuples in that space (e.g. FIG. 5a) allowing a Client Application 1, 2, 3 to subscribe to those of interest. Thus for example, the application (or user) may choose to subscribe to any new thoughts, but not to be informed of new image additions to the relevant space.

A LoadXML service takes a specified XML file and converts it into Element Tuples (e.g. FIG. 5c) using the format described in the XML representation interface (i.e. the DTD—FIGS. 5a, 5b) and resolving discrepancies between existing Element Declaration tuples. In other words, previous sessions can be loaded. Thus in the example, the file shown in appendix B is loaded (i.e. a couple of thoughts are displayed, "thought 1" and "thought 2" and these are linked by relationship "link12" There is also a group consisting of "Group Text" and thought "t4").

A SaveXML service takes a specified Node and converts any hierarchy below that Node, as well as the associated grammar (i.e. the DTD), into an XML document of a specified name. This XML document may then be formatted as desired for display using style sheets or other Extensible Style Language (XSL) translators (e.g. for display as a web page etc.).

A New ElementDeclaration service creates a new ElementDeclaration Tuple and associated AttributeDeclaration Tuples.

A NewElement service creates a new Element Tuple based on a specified Element Declaration tag name and its defined structure, inserting default values for all attributes and mandatory content.

An UpdateElement service transfers a supplied Tuple state to the Space Server Application (ServerX or ServerY). The DeleteElement service on the other hand, removes the specified Tuple from the Space Server Application.

A NewNode service creates a new Node Element Tuple from the supplied ElementDeclaration tag name and "name" attribute (e.g. NewNode(thought, humorous)). The NewEdge service creates a new Edge Element Tuple from the supplied ElementDeclaration tag name, "name" attribute and "from" and "to" TupleIDs (e.g. New Edge (relationship, link12, 21, 22)).

A NewGroup service creates a new Group Element Tuple from the supplied Element Declaration tag name, and "name" attribute with an empty "group" attribute.

As previously mentioned, XML is a language for defining hierarchical structures. However, rather than provide a New Hierarchy service, the preferred embodiment relies on the Element Declaration tuples to define the structure of the hierarchy via their content model field. In other words, they define which elements can exist on a particular level of a hierarchy. For example, a brainstorm may exist on the top level, and any number of thoughts and images may exist on the next level down since these form part of the brainstorm Element Declaration tuple's content model (see FIG. 5a). Thus the brainstorm Element may contain thoughts, images etc.

Thus a number of services are provided for enabling information within the hierarchy to be manipulated.

These services include Push Element, whereby a element is created standalone, but may be "pushed" into another hierarchical structure. The content field of the element into which the stand alone element is pushed is thus populated with the tupleid of that standalone element. Pop Element does the opposite by allowing an element to be removed from a hierarchy and made standalone. Thus the tupleid of the element being "popped" is removed from the content field of the original containing element. Elements may also traverse levels within the hierarchical structure.

A SubscribeElementTag service takes the specified Element Declaration tag name and retrieves all Elements in the space that have that tag. Thus if an ETN of "thought" is specified (see FIG. 5a, tupleid 2) then all the elements of type "thought" will be retrieved. In the example defined by Appendix B, this means that thought1, thought2, t4 and their respective contents will all be retrieved.

Furthermore, the service registers callbacks with the TupleSpace server application ServerX, ServerY, to be informed whenever any Elements of the specified tag(s) get created, updated or deleted. The subscription is held in the Client Services Interface together with the current state of tuples that adhere to that subscription (see below).

A GetChanged service enables the Client Application code to poll the Client Services Interface and hence discover any changes in the subscribed Tuples. References (tupleids) to the changed Tuples are returned as a vector from the call.

A CopyToSpace service enables a specified Node Element (and any relevant Element Declarations) to be copied to a specified Space. Likewise, a MoveToSpace service, performs a CopyToSpace and (if successful) removes those elements from the originating local Space. Such services are particularly useful where there are a plurality of groups working together to achieve an overall team goal. A single group may share ideas within their own space and once they have finalised the information, transfer it to a team space.

A MirrorToSpace service checks to see if the specified Node is already registered within the specified Space, and if so performs an update for the specified Node in the specified Space. While the client application is registered with the local Space, updates to that Node (or its children) will be sent to the specified Space.

Note according to the preferred embodiment, the services within the client services interface are implemented as a set of Java classes which enable ideas and knowledge to be manipulated, written out to the specified space, and read in from the specified space as described above.

Figure 7:
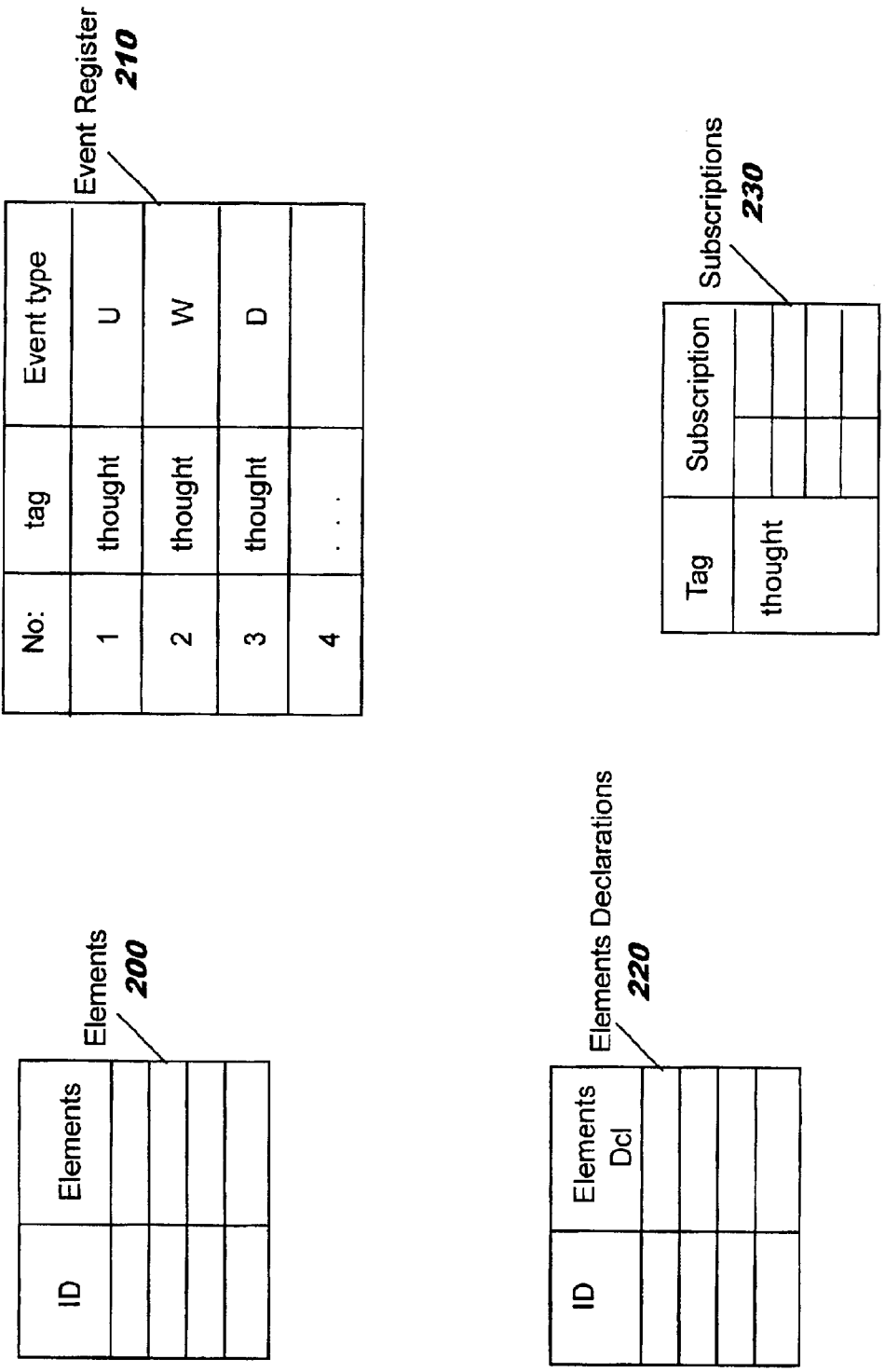
FIG. 7 shows the TupleSpace Client Interface in detail according to a preferred embodiment.

As previously mentioned, it is the TupleSpace Client Interface 110 which provides each client with access to the TupleSpace Infrastructure 100 and thus the specified space. FIG. 7 illustrates this interface in more detail.

The interface comprises a plurality of hash tables for maintaining the current status of the information in the space to which it is connected, as known about by the client.

A subscription table holds a list of the types of element to which the client has subscribed to by invoking the SubscribeElementTag service in the Client Services Interface, via the client application 1. In the example, the client wishes to be informed of all new thoughts added to the space, as well as any changes to those already present (including deletions). Thus the first entry in the tag column is thought. The subscription column contains the tupleid of each instance of the element type thought, as well as the actual tuple. Therefore if the space contains the tuples defined in Appendix B, then the subscription column will include tuples for thought1, thought2 and t4.

An Elements table 200 holds a complete list of the elements about which the client is aware (i.e. those elements which exist in the space and to which the client has subscribed).

An Element Declaration table 220 holds the tuple id and the corresponding tuple for each type of element that can be subscribed to by the client (i.e. those defined in the space).

Finally, an event register 210 lists the events that the client is monitoring on the space. Thus in this example the updating (U) of a thought element, the addition of a new thought (W) and the deletion (D) of a thought from the space are all events which the client wants to be aware of. The first column in this table is used to refer to a particular event by number.

The Tuple Space Client Interface also provides java methods to enable a Tuple to be added to, or removed from, the space. Further a method is provided for retrieving a tuple with the tupleid specified as a parameter (Get Tuple(ID)). A SetAttribute method is used for setting the content of a tuple field and subscribes to the following format: SetAttribute ([name], [tupleid], [value]).

Client Browser Application

According to the preferred embodiment, Client Application 1 is a browser application. It tests the interfaces 110, 120, 130, 140 and allows a user to manually invoke the services provided by the Client Services Interface 140. Thus it is possible to exchange ideas with other people with similar Client Browser Applications (as well as other Client Applications).

Figure 8:
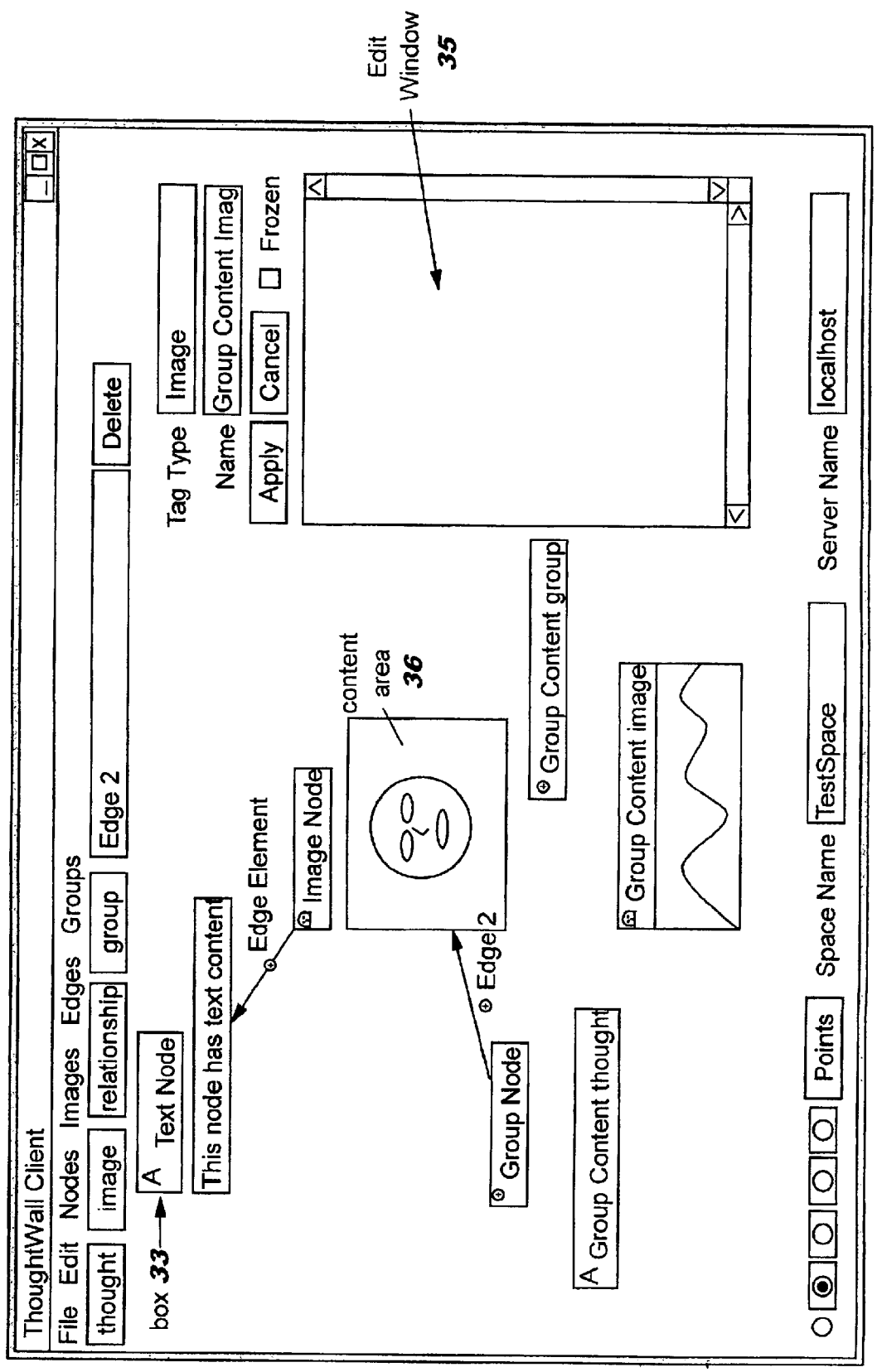
FIGS. 8 and 9 are screen shots of the client browser application implemented according to a preferred embodiment of the present invention.

The Client Browser Application provides a view of all subscribed Nodes, Groups, related Edges etc. within a Space. An example of this view is provided in FIG. 8. The Client Application is responsible for rendering the information stored within the TupleSpace appropriately for the client upon which it is running.

The pull down menus (i.e. the toolbar consisting of a nodes; images; edges; and groups menu) maintain a list (not shown) of the types of element or nodes that can be added to a space, TestSpace. According to the preferred embodiment, these are Nodes including: thoughts (e.g. TextNode); images (e.g. ImageNode); and Groups (e.g. Group Node); and Edges (or relationships) (e.g. Edge Element and Edge 2) that have been subscribed to. Selecting one of these makes it the default Element type to be created when the corresponding New Element button is pressed (e.g. the thought, image, relationship or group button directly below the toolbar).

When creating a new Edge, the relationship button is pressed and then the "from" Node and the "to" Node selected. Nodes or Edges may be deleted by selecting them and then pressing the Delete button.

In this case, Nodes are rendered by the application as boxes (e.g. box 33) with their "name" attribute in the box (e.g. "TextNode") and an icon (e.g. "A") indicating the type of XML content within them. Edges are indicated as arrows going from the "from" Node to the "to" Node with an icon and the "name" attribute displayed on the screen (e.g. Edge Element with a "from" Node of ImageNode and a "to" Node of TextNode).

Figure 9:
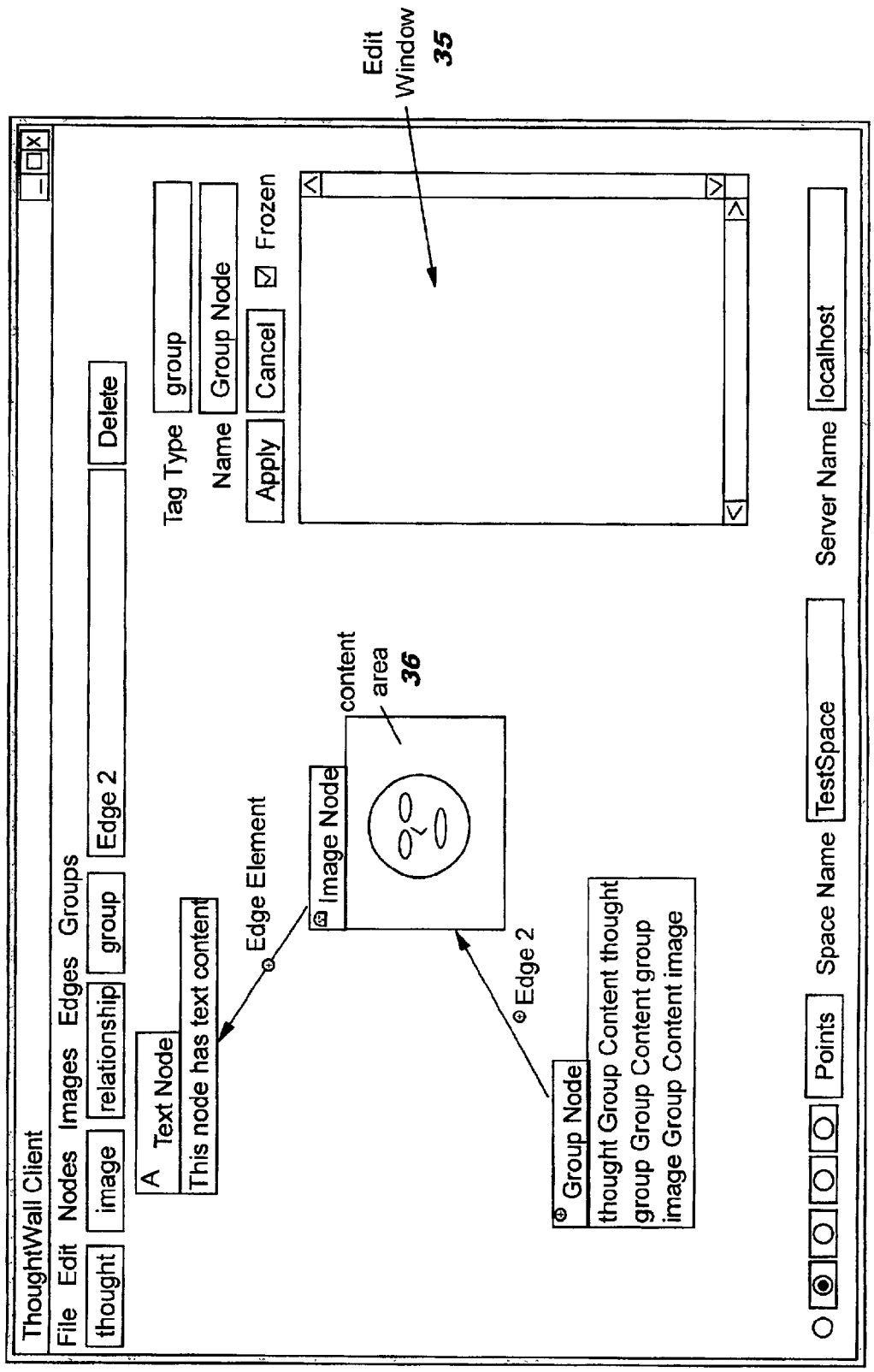

For the thought and image Nodes the Client Browser Application displays a content area 36 below the box containing either the text content if the content is only unformatted text, or an image if the content is an image. For Groups, the content area shows a list of the group content indicating the tag (Element Declaration type) and its name (see FIG. 9). Note, "Group Content thought" is a node of type thought, and "Group Content image" is a node of type image. Group Node is a group which is shown in FIG. 9 as containing both "Group Content thought" and "Group Content image".

Preferably, any Node or Edge may be selected by clicking the mouse button when the cursor is over its associated icon. The tag, the name and any text content then appear in an edit window on the right hand side. The name and text content may be altered at this point in the edit window 35 and applied which will cause the Element to be updated with those new values in the Space. Other attributes associated with a particular Node or Edge may also be edited via the edit window.

Nodes containing an Image are edited by drawing within the content area or by importing an image from file. Alternatively, an image content area may contain a link to an image file. Nodes may be added to a Group by selecting them and dragging them onto the content area of the group, or removed by dragging them off the content area.

The view provided is altered by the user by dragging the Nodes around the screen. Edges remain connected to their nodes ensuring that relationships are preserved. Thus a means of automatically laying out the view to assist in assimilation of the relationships between ideas is provided. All Nodes will therefore repel each other and all Edges will attempt to keep their length at a value specified for example via a "length" attribute. Nodes are locked into place to disable this automatic layout when the desired positioning has been achieved. It is therefore possible for users to arrange the ideas according to their individual preference. This is particularly advantageous since users will typically like to organise their thoughts differently from one another.

While this Client browser application runs on a desktop platform using conventional mouse and keyboard for input, it can also be run with an intelligent whiteboard allowing drawings to be captured naturally and using handwriting recognition to enter text. It can also be run in conjunction with speech recognition that will convert spoken work into text for inclusion in the Elements being edited.

Furthermore, as previously described the invention may incorporate, for example, non-interactive applications instead of, or alongside, the more interactive browser type application described above. Such applications can be monitoring one or more specified spaces and each time a new element is added to a monitored space, the application searches through an associated database or data source for more information concerning the recent addition and adds results as ideas to the space to be subsequently rendered by other client applications. Results of interest are kept by users monitoring the space through their client application, whereas uninteresting results can simply be discarded. Examples of such applications include:

Data mining tools such as Intelligent Miner for Data/Text (both available from IBM Corporation);

Query by Image Content (QBIC) software (available from IBM Corporation) for monitoring image ideas sketched by the user or outlined by the user; If for instance a picture of President Kennedy (or a reference to such a picture) is added to a space, then the QBIC client would search its database to pull-back any related information such as selected pictures or even facts etc. and adds this to the space as appropriate tuples;

Multi-media jukeboxes for returning pieces of music or video relating to ideas added to a monitored space; and Internet search engines which return hyperlinks relating to ideas added to a monitored space.

Thus the invention is particularly useful to market research and advertising campaigns, brainstorming sessions, team meetings etc. It allows a group of people to share information, and to receive additional material based on the information added by members of the group or back-up data sources.

Thus the present invention provides an extremely flexible and comprehensive way of dynamically sharing knowledge between heterogeneous devices.

Further a new DTD describing additional element types may be loaded into the space. The Client Browser then adapts its graphical user interface (GUI) to present these new types of element to a user of the browser application for inclusion in a particular knowledge sharing session in which they are participating.

WORKED EXAMPLE

Each of the layers shown in FIG. 4 have thus far been described very much in isolation from another. A worked example will now be provided explaining how the layers interact to provide the overall solution of the preferred embodiment.

Figure 10:
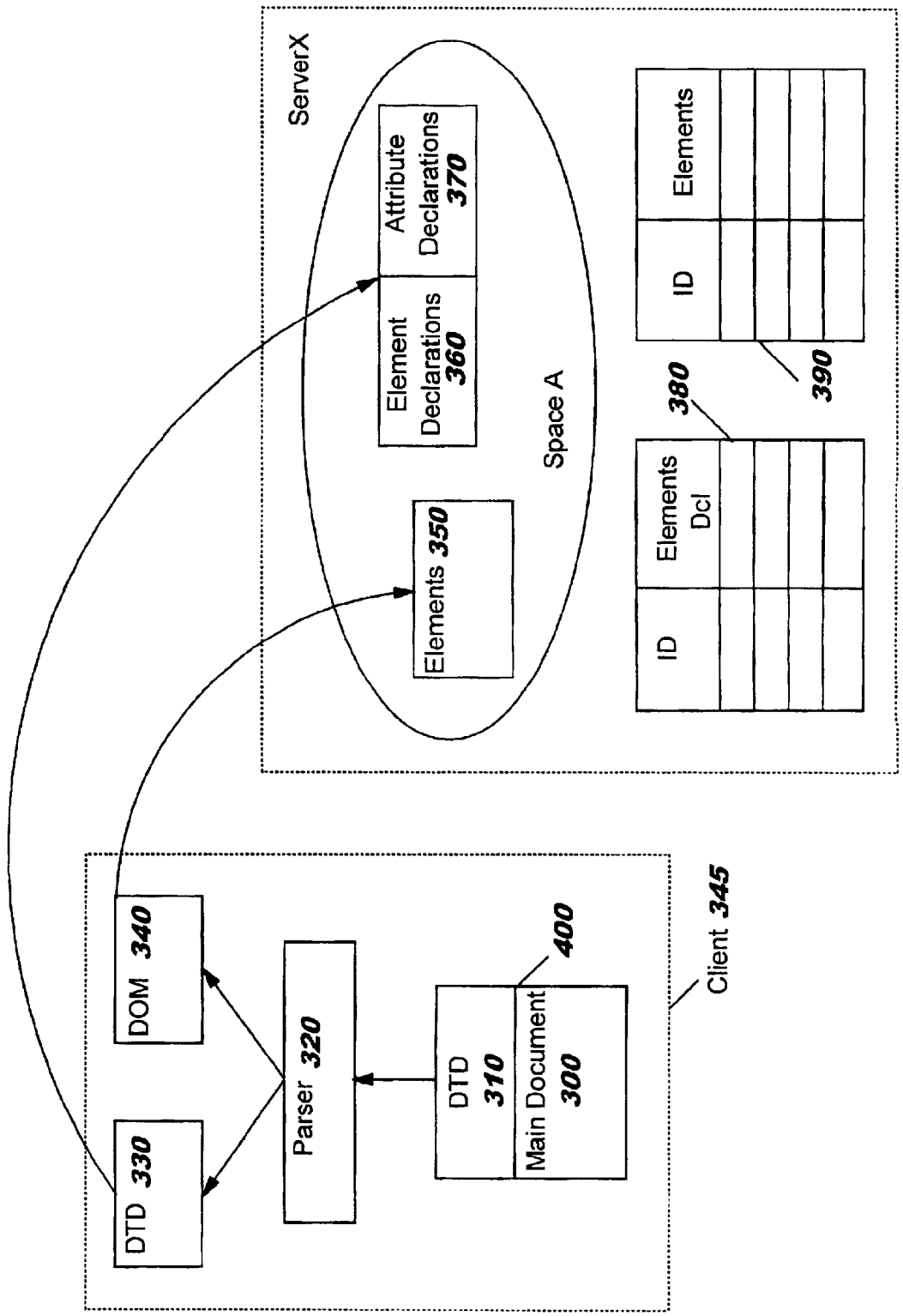
FIG. 10 illustrates an overview of the processing performed in accordance with the OpenSpace and Load XML services of the Client Services Interface according to a preferred embodiment of the present invention.

FIG. 10 illustrates an overview of processing performed in accordance with the OpenSpace and Load XML services of the Client Services Interface according to a preferred embodiment of the present invention. FIG. 11 is a flow chart of a worked example of the present invention. FIGS. 10 and 11 will be used in conjunction with FIG. 4 to present the worked example.

Client application 1 (running on client 345) invokes the OpenSpace service in the client services interface (step 400). A space, A and the server application hosting the space (ServerX) are both specified as parameters to this service. A connection is made to the specified space directly via the TupleSpace Client interface 110.

The Server Application (ServerX) includes a hash table of all the element declarations 380 stored within the space and a further hash table of all the elements 390 within the space. Thus these are scanned and the information within them is retrieved to the client 345 (step 410). In the example, the space is empty and so nothing is retrieved.

The LoadXML service in the Client Services Interface is then invoked via Client Application 1 (step 420). A specified XML document 400, including a main document 300 and a DTD 310, is stored at the client. This is loaded into memory (not shown) and run through a parser 320.

In the preferred embodiment a validating XML parser is used to read this file to verifies that the brainstorming elements conform to the structure defined in the relevant DTD (in this case default.dtd of appendix A). The markup "<!DOCTYPE brainstorm SYSTEM "default.dtd">" references this DTD. Note, a non-validating parser would read only the markup and text contained within the <brainstorm> tag, it would not cross-check with a DTD for structural conformance.

According to the preferred embodiment, the parser reads the XML document, default.xml, and the DTD, default.dtd to create to produce the DTD 330 and a Document Object Model (DOM) 340. The DOM comprises a tree structure with the individual thoughts, images etc. forming nodes within that structure. This structure is then used to create tuples for storage within the appropriate TupleSpace.

The ElementDeclaration (ED) and AttributeDeclaration (AD) classes within the XML Representation layer provide the structure for creating corresponding tuples 360, 370 using the information in DTD 330 (step 430). These are stored locally at the client in hash table 220 before being transmitted to space A (step 450). Note AttributeDeclaration tuples are embedded within their associated ElementDeclaration tuple within this table rather than being stored in their own right.

The Element class, also within the XML Representation layer, provides structure for the creation of Element tuples 350 in accordance with the information stored in DOM 340 (step 440). Each Element tuple is based upon an Element Declaration tuple and this is passed in as a parameter. The newly created element tuples are stored locally at the client in hash tables 200 and 230 before also being transmitted to the space (step 450).

Note when the Element tuples and the ElementDeclaration/Attribute Declaration tuples are stored within space A an entry to that effect is made in hash tables 380/390 as appropriate. Client Application 1 interprets the information stored within the space to provide a visual representation.

Either the NewElement or NewNode service in the Client Services Interface is then invoked via Client Application 1 (step 460). In either case the Element java class provides the structure for the creation of a new element tuple and the corresponding Element/Attribute Declaration tuples ensure that the information entered into this tuple is of the permitted type and format (in other words conforms to the DTD). Note if the appropriate ElementDeclaration tuple does not exist within the hash table 220, then the appropriate tuple is retrieved from the space and entered into the hash table. It is then passed in as a parameter to the Element java class. If a NewNode is created then the Graph representation layer requires that a 'name' by which to identify the XML Node Element be provided.

In either case the new tuple is populated (step 470) using methods provided by the TupleSpace Client Interface. The ElementTag is based upon the ElementDeclaration tag name (i.e. an element of type 'thought' has an ElementTag of 'thought'). The parent tupleid is retrieved and entered in. The Attribute fields are then filled with content. With a thought element for example, the 'name' attribute is provided via the client application 1 and the 'id' attribute is uniquely allocated. The SetAttribute method within the TupleSpace Client Interface enables these attribute values to be set.

The new tuple is stored locally in hash tables 200 and 230 and is then transmitted via the TupleSpace Infrastructure 100 to ServerX and stored in the space A (step 480). An entry is also made in hash table 390.

When the NewEdge service is invoked via client application 1 (step 490) the process is almost the same as for the creation of a NewNode. However as previously mentioned, an edge has 'from' and 'to' attributes specifying source and destination nodes. According to the preferred embodiment, the Graph Representation Layer requires that an edge be created between two nodes only. Further it requires that the 'from' and 'to' attributes are filled in, in order to define a relationship between the two specified nodes (step 500). The Edge tuple is transmitted to the space (step 510) and the Client Application interprets all defined relationships to render a directed graph.

As previously discussed, the client application can also invoke a SubscribeElementTag service (step 520) via the Client Services Interface. When invoking this service, the client application specifies for example that it wishes to be informed whenever an element of type 'thought' is added to the space, updated or deleted from the space.

An element tuple of type "thought" is created as described above, but in this instance the tuple contains only the Element Tag Name (step 530). This special tuple is transmitted to the server application ServerX and several entries made in an event register hash table maintained at the server (not shown). Hash table 210 at the client is a copy of this and thus the entries at the server are replicated at the client. The event register table at the server (just like table 210) contains entries pertaining to events which the client wishes to be informed about. In the example these are updates (U), writes (W) and deletions (D) on the space. Thus the server is aware that it is to call the client back when one of the relevant events occurs. The client is also aware of the events that it is listening for via table 210 (step 540). The GetChanged Service enables the client application to poll the TupleSpace Client for changes relating to the information described in the event register 210.

The special tuple is then again transmitted to server application ServerX and is compared with the entries in hash table 390 which contains a list of all tuples in the space. All tuples within this table whose ElementTagName matches that of the special tuple are retrieved to the client (to the TupleSpace Client Interface) (step 550). These tuples are entered into the Element hash table 200. They also go into the subscriptions table under the tag 'thought'.

To delete an element, the DeleteElement service in the Client Services Interface is invoked via client application 1 (step 560). A request is transmitted to ServerX to remove a specified tuple from the space and the relevant entries in hash tables 200 and 230 on the client and hash table 390 on ServerX are also removed.

To update an element, the UpdateElement service in the Client Services Interface is invoked via client application 1 (step 570). The tuple to be updated is specified as a parameter to this service and hash table 200 scanned to retrieve the appropriate tuple. Information is provided via client application 1 and the modified tuple stored in hash tables 200 and 230. The modified tuple is then transmitted via TupleSpace Infrastructure 100 to ServerX and stored in space A. Note hash table 390 is also updated with the modified tuple.

Note, the set of steps shown in parallel with one another and between brackets may be performed in any order and any number of times. The other services provided by the Client Services Interface will not be mentioned in detail here but use the layered architecture in a similar fashion to that described above.

What is claimed is:

1. A data processing system adapted to run on a client apparatus connectable with a server across a network, said server adapted to simultaneously share information maintained therein with a plurality of heterogeneous clients, wherein said information comprises a plurality of ideas, said apparatus comprising:
   means for retrieving said ideas from said server;
   means for defining a new idea in a manner dependent on the client apparatus platform, wherein the means for defining the new idea comprises:
      means for creating at least one element declaration tuple that defines a element type and at least one attribute, wherein the element type is one of a thought, an image, a group, a relationship and a hierarchy:
      means for creating at least one attribute declaration tuple that describes the at least one attribute associated with the element declaration tuple, wherein the at least one attribute defines an individual characteristic of the element type; and
      means for creating at least one element tuple that describes the instance of the element declaration tuple; and
      means for transmitting said new idea to said server for maintenance in a platform-independent manner.

2. An apparatus as claimed in claim 1 wherein said application is interactive and includes:
   means for rendering said retrieved ideas in a manner dependent on the client apparatus platform; and
   means, responsive to user interaction, for manipulating said retrieved ideas.

3. An apparatus as claimed in claim 1 wherein said application is non- interactive and includes:
   means, responsive to new ideas of a pre-determined type transmitted to said server, for defining a search; and
   wherein said defining means is responsive to said search results for encoding said results as ideas for transmittal by said transmitting means to said server.

4. An apparatus as claimed in claim 2, wherein said ideas comprise at least one relationship idea having attributes defining a link between two lother ideas and wherein said application includes means for defining a relationship between two ideas.

5. An apparatus as claimed in claim 1, wherein at least one of said ideas includes a name attribute.

6. An apparatus as claimed in claim 2 wherein said ideas are ideas of one or more types and said means for defining is adapted to define ideas of a pre-determined type.

7. An apparatus as claimed in claim 6 wherein said apparatus further comprises:
   means, responsive to an idea of a new type being defined, for adapting said rendering means to render ideas of said new type.

8. An apparatus as claimed in claim 6, wherein said idea types comprises at least one of thoughts, images and groups of ideas.

9. An apparatus as claimed in claim 6, comprising:
   means for subscribing to specified idea types such that said client application is informed when ideas of said type are transmitted to said server.

10. An apparatus as claimed in claim 6, wherein ideas of at least some of said idea types are defined as being adapted to contain ideas of at least one idea type.

11. An apparatus as claimed in claim 10, comprising:
    means for constructing a plurality of hierarchies of ideas;
    means for moving ideas within a hierarchy according to said idea types; and
    means for transferring ideas between hierarchies according to said idea types.

12. An apparatus as claimed in claim 11, comprising:
    means for selecting one of said rendered ideas; and
    means for converting said one idea and any ideas below said one idea in a hierarchy to a markup document comprising definitions associated with any idea types of ideas within said hierarchy and definitions of any ideas within said hierarchy.

13. An apparatus as claimed in claim 11 comprising:
    means for loading a markup document comprising definitions associated with any idea types of ideas within a hierarchy of ideas in said document and definitions of any ideas within said hierarchy as new ideas.

14. An apparatus as claimed in claim 12, wherein said markup document language is Extensible Markup Language (XML).

15. An apparatus as claimed in claim 1, wherein said means for maintaining new ideas at the server stores said new ideas as tuples of a TupleSpace at said server.

16. A computer program product comprising computer program code stored on a computer readable storage medium, the program code;
    instructions for retrieving said ideas from said server;
    instructions for defining a new idea in a manner dependent on the client apparatus platform, wherein the instructions for defining the new idea comprises:
       instructions for creating at least one element declaration tuple that defines a element type and at least one attribute, wherein the element type is one of a thought, an image, a group, a relationship, and a hierarchy;
       instructions for creating at least one attribute declaration tuple that describes the at least one attribute associated with the element declaration tuple, wherein the at least one attribute defines an individual characteristic of the element type; and instructions for creating at least one element tuple that describes the instance of the element declaration tuple; and instructions for transmitting said new idea to said server for maintenance in a platform-independent manner.

17. A method in a data processing system adapted to run on a client apparatus connectable with a server across a network, said server adapted to simultaneously share information maintained therein with a plurality of heterogeneous clients, wherein said information comprises a plurality of ideas, said method comprising the steps of:

retrieving said ideas from said server;

defining a new idea in a manner dependent on the client apparatus platform, wherein defining the new idea comprises:

creating at least one element declaration tuple that defines a element type and at least one attribute, wherein the element type is one of a thought, an image, a group, a relationship, and a hierarchy;

creating at least one attribute declaration tuple that describes the at least one attribute associated with the element declaration tuple, wherein the at least one attribute defines an individual characteristic of the element type; and creating at least one element tuple that describes the instance of the element declaration tuple; and transmitting said now idea to said sever for maintenance in a platform-independent manner.

* * * * *

UNITED STATES PATENT AND TRADEMARK OFFICE
CERTIFICATE OF CORRECTION

PATENT NO. : 6,901,441 B2
DATED : May 31, 2005
INVENTOR(S) : Bent et al.

It is certified that error appears in the above-identified patent and that said Letters Patent is hereby corrected as shown below:

Column 15,
Line 1, after "The" delete "Tuple Space" and insert -- TupleSpace --.

Column 20,
Line 3, after "two" delete "1other" and insert -- other --.
Line 52, after "code" delete ";" and insert -- : --.

Column 22,
Line 12, after "transmitting said" delete "now" and insert -- new --.

Signed and Sealed this

Third Day of January, 2006

JON W. DUDAS
*Director of the United States Patent and Trademark Office*